United States Patent Office 3,733,205
Patented May 15, 1973

3,733,205
ENZYMATIC REMOVAL OF DIACETYL FROM FERMENTED BEVERAGES
John Shovers, Shorewood, Wis., and William E. Sandine, Corvallis, Oreg., assignors to Pfizer Inc., New York, N.Y.
No Drawing. Filed Aug. 7, 1970, Ser. No. 62,193
Int. Cl. C12h 1/12; C07g 7/02
U.S. Cl. 99—48
6 Claims

ABSTRACT OF THE DISCLOSURE

A process for the enzymatic removal of diacetyl from beer and ale by the addition of diacetyl reductase and reduced nicotinamide adenine dinucleotide or combinations of whole bakers' or brewer's yeast with diacetyl reductase and reduced nicotinamide adenine dinucleotide which have been micro-encapsulated with gelatin or calcium alginate.

BACKGROUND OF THE INVENTION

In the production of alcoholic beverages such as beer and ale, a phase of the manufacturing process involves fermentation of cereal extracts (often referred to as wort) with certain suitable yeasts. During the fermentation process, the yeast cells produce a variety of chemical compounds in addition to ethyl alcohol which contribute to the flavor of the finished product. Selection of the strains of yeast to be used in the commercial fermentation of beer or ale is based on the relative amounts of compounds they produce, as determined by actual chemical analyses and by flavor of the final product. Careful attention must be paid by the brewer to select and preserve the strain of yeast used for his fermentation. Rigid quality control standards must be employed to prevent the introduction of extraneous flavors which detract from the characteristic and highly desirable taste and flavor of the finished product.

Diacetyl (2,3-butanedione) is produced in varying amounts by the yeast during the carbohydrate fermentation. Beyond a threshold level of 0.20–0.30 p.p.m. w./v., the presence of diacetyl adversely affects the flavor and taste of beer and ale.

The enzyme diacetyl reductase reduces diacetyl in the presence of a cofactor, reduced nicotinamide adenine dinucleotide (NADH), as reported by Strecker, H. J. and Harary, I. J., Biol. Chem., 211, 263 (1954).

Diacetyl reductase is apparently widely distributed in the plant and animal kingdom. This enzyme is present in growing cultures of bacteria such as *Aerobacter aerogenes*, *Staphylococcus aureus*, *Neisseria winogradskyi*, *Pseudomonas fragi*. *Streptococcus diacetilactis*, strains of yeast, from wheat germ and animal tissue such as pigeon breast muscle, beef liver and pig heart muscle.

U.S. Pat. 3,130,055 covers a method for removing the objectionable buttery odor and flavor of diacetyl from beer which comprises adding to the beer a small but effective amount of diacetyl reductase. This process suffers from the fact that the low pH of beer (3.9–4.4) causes rapid inactivation of the enzyme due to acid hydrolysis of the co-factor, reduced nicotinamide adenine dinucleotide.

SUMMARY OF THE INVENTION

This invention relates to the coating of diacetyl reductase and reduced nicotinamide adenine dinucleotide; or these enzymes in combination with viable brewers' or bakers' yeast, containing within the cell walls of said yeast the enzyme-co-factor system of diacetyl reductase and reduced nicotinamide adenine dinucleotide, with gelatin or calcium alginate. The diacetyl content of beer is lowered by the addition of a small but effective amount of one of these coated materials to beer during the latter stages of fermentation or during any of the finishing processes subsequent to fermentation and prior to packaging.

DETAILED DESCRIPTION OF THE INVENTION

U.S. Pats. 2,642,376, 3,167,485 and 3,223,593 describe and claim various processes for the micro-encapsulation of isolated enzymes. This invention is concerned with the micro-encapsulation of diacetyl reductase and reduced nicotinamide adenine dinucleotide, and these enzymes in combination with viable cells of bakers' or brewers' yeast which contain within them the intact enzyme co-enzyme system. More particularly, this invention relates to methods for encapsulating these materials with a semipermeable membrane which allows the passage of diacetyl from beer or ale into the coated enzyme materials where it is reduced by the enzyme and co-enzyme system (diacetyl reductase and reduced nicotinamide adenine dinucleotide).

In the process of this invention, isolated diacetyl reductase and reduced nicotinamide adenine dinucleotide enzymes are encapsulated with gelatin or calcium alginate. The semipermeable protective coating allows the enzyme co-enzyme system to operate at the naturally acidic pH of beer (3.9–4.4) without undergoing loss of activity due to denaturation of diacetyl reductase or irreversible acid hydrolysis of reduced nicotinamide adenine dinucleotide.

In an embodiment of the invention, bakers' or brewers' yeast (containing diacetyl reductase and reduced nicotinamide adenine dinucleotide) is incorporated with diacetyl reductase and reduced nicotinamide adenine dinucleotide or with diacetyl reductase alone. The novelty of the micro-encapsulating film is that it prevents the bakers' yeast (*Saccharomyces cerevisiae*) or the brewers' yeast (*Saccharomyces carlsbergensis*) from escaping into the beer where it could be considered a "wild" type yeast by the brewer, while maintaining cell viability. Furthermore, the protected yeast cells can operate at the naturally acidic pH of beer (3.9–4.4) without undergoing denaturation or inhibition of the enzyme systems contained within the cell structure of the yeast.

The micro-encapsulated materials may be added to beer or ale during the latter stages of fermentation or to any of the finishing processes subsequent to fermentation and prior to packaging. The art can readily determine the choice and amount of the coated enzyme material to be used, and will depend on a variety of factors such as the concentration of diacetyl in the beer or ale to be treated, the desired diacetyl concentration to which the brewer wishes to bring his beer or ale, the temperature of the beer or ale being treated and the time allowed for the enzyme treatment. At the preferred stage of addition at ruh storage (the holding period at 0–7° C.), approximately 1 to about 2 grams or microencapsulated enzyme material are added per liter of beer or ale. After about 72 hours or after the diacetyl concentration has been reduced to the desired low level, the micro-encapsulated enzyme material is removed by filtration. Diacetyl determinations are made by the colorimetric assay described by Owades, J. L. and Jakovac, J. A., Proc. Am. Soc. Brew. Chem., pp. 22–25 (1963) and modified by Pack et al., J. Dairy Sc., 47, 981–986 (1964).

Diacetyl reductase is widely distributed in microbial, animal and plant life. For the purposes of this invention, the enzyme is conveniently prepared from a strain of *Aerobacter aerogenes*. The bacteria are grown in a glucose, peptone broth for about 24 hours at 30° C. The bacterial cells are harvested by means of a refrigerated centrifuge. The packed cells are resuspended and washed several times in 0.1 M potassium phosphate buffer pH 7.2, and then resuspended in buffer to a volume of about 50 ml. A crude enzyme extract is prepared by disrupting the cells in a sonic oscillator for about 20 minutes. The cell debris is removed by centrifugation at about 27,750 ×G for about 1 to about 2 hours in a refrigerated centrifuge. The supernatant is dialyzed in a cellophane bag at 0–5° C. against several changes of distilled water, each dialysis lasting about 8 hours. The material inside the cellophane bag is then lyophilized and stored at −20° C. until used.

The diacetyl reductase co-factor, reduced nicotinamide adenine dinucleotide, may be prepared from microbial sources such as bakers' yeast. For the process of this invention, it is conveniently obtained as a commercially available refined product (P–L Biochemicals, Milwaukee, Wis.).

A high-bloom (high molecular weight) gelatin is employed for the microencapsulation process because of its insolubility in beer. Ratios of materials to be encapsulated to gelatin of from 1:1 to about 9:1 can be successfully utilized but the amount of gelatin is critical only in that it must completely micro-encapsulate the active components. For encapsulated materials containing whole yeast cells, complete micro-encapsulation is readily determined by plating out the material on wort agar. No growth of yeast cells will result from satisfactorily encapsulated material.

Gelatin is added to water and heated to about 40° C. until the gelatin has dissolved. The solution is cooled to about 30° C. and the pH adjusted to 6.0 with 1 M NaOH. A mixture, in stoichiometric ratio, of diacetyl reductase and reduced nicotinamide adenine dinucleotide is stirred in and the mixture spread uniformly as a thin film on sheets of polyethylene. After about 24 hours at room temperature, the translucent gelatin-enzyme-co-factor film is peeled from the polyethylene and cut into small pieces approximately 1.0 cm. square. The film pieces are stored in a tightly stoppered container at 2–5° C.

In an alternate process, the gelatin-enzyme mixture is chilled to about 2–10° C. until the gelatin has set and the coated mass is macerated with a high shear mixer. The material is tray dried at about 2–10° C. and then about 22–25° C. to a final moisture content of about 7 to about 11%, preferably about 8%.

The regeneration of co-factor (reduced nicotinamide adenine dinucleotide) by viable cells of bakers' or brewers' yeast makes possible a mixture of whole yeast cells, diacetyl reductase and the reduction of co-factor to about 0.1 the normal amount or even its elimination entirely.

When mixtures of diacetyl reductase and reduced nicotinamide adenine dinucleotide containing whole yeast cells are encapsulated and recovered as ground or milled material, there is the possibility of sheared surfaces exposing non-encapsulated yeast cells. This is obviated by a coacervation process in which the yeast containing material is dispersed in light mineral oil which is then added in a thin stream with vigorous stirring into an aqueous solution of high-bloom gelatin. The enzymes and yeast cells are dispersed in the oil medium and each particle is coated with a gelatin-water film. The mixture is chilled to about 10–20° C. which hardens the gelatin around the yeast cells and enzyme particles with the formation of discrete beadlets. Several liters of cold ethanol are added to partially dehydrate the beadlets. The beadlets are removed by filtration, washed with cold hexane and tray dried or fluid-bed dried at about 5–10° C. to a final moisture content of about 7 to about 11%, preferably about 8%.

A novel process for encapsulation in beadlet form involves the use of a water and alcohol insoluble metal alginate. The materials to be encapsulated are dispersed in an aqueous solution of a water-soluble alkali metal alginate such as potassium alginate, or preferably, sodium alginate, the concentration of which is limited to approximately 2% because of viscosity. This is added to a solution of an inorganic salt which is capable of reacting with the soluble metal alginate to form an insoluble metal alginate, and while precipitating out of solution, simultaneously coats the individual yeast cells and enzyme particles with a film of insoluble metal alginate. For reasons of toxicity, the preferred inorganic salt is calcium chloride which reacts with sodium alginate to form a film of non-toxic calcium alginate around the individual yeast cells. Obviously, other inorganic salts which are capable of reacting with sodium alginate to form water and alcohol insoluble alginates which are non-toxic may also be used. Beadlets prepared by this process are tray dried or fluid-bed dried to a final moisture content of about 10 to about 20% preferably about 15%.

The following examples are merely illustrative and are not intended to limit the invention, the scope of which is defined by the appended claims.

EXAMPLE I

*Aerobacter aerogenes* ATCC No. 8724, is grown from a 1% inoculum for 24 hours at 30° C. in 40 liters of sterile broth of the following composition in grams per liter: glucose (20), yeast extract (10), peptone (20), Tryptone, BBL-Laboratories, Baltimore, Md.

Following growth, the bacterial cells are harvested with the use of a continuous flow attachement for the Sorvall RC–2 refrigerated centrifuge at 12,000×G with a flow rate of about 300 ml. per minute. The packed cells are resuspended in 0.1 M potassium phosphate buffer at pH 7.2. The cells are washed three times in buffer and then resuspended in buffer to a volume of about 50 ml.

A crude diacetyl reductase extract is prepared by disrupting the bacterial cells in a Raytheon 10KC sonic oscillator for about 20 minutes. The cell debris is removed by centrifugation at 27,750×G for about 1.5 hours in the refrigerated centrifuge. The supernatant is placed in a cellophane bag and dialyzed at 0–5° C. against three, 4-liter changes of distilled water, with each dialysis lasting about 8 hours. The material inside the cellophane bag is lyophilized and stored at −20° C. until used. The diacetyl reductase activity of the enzyme preparation, as measured by the ability to reduce diacetyl, is determined by the method of Owades, J. L. and Jakovac, J. A., Proc. Am. Soc. Brew, Chem., pp. 22–25 (1963).

EXAMPLE II

Ten grams of gelatin (Swift and Company Super Clear Gel, Type AG–10) are added to 50 ml. of distilled water, and the mixture heated to about 40° C. until the gelatin is dissolved. The solution is cooled to 30° C. and the pH adjusted to about 6.0 with 1 M NaOH. Four hundred milligrams of freeze-dried diacetyl reductase enzyme preparation and 160 milligrams of reduced nicotinamide adenine dinucleotide (P–L Biochemicals, Milwaukee, Wis.) are then mixed in, and the mixture spread uniformly as a thin film on sheets of polyethylene. After about 24 hours at room temperature, the translucent film is peeled from the polyethylene sheets, cut into pieces approximately 1.0 cm. square, and stored in a tightly stoppered container at 2–5° C.

To 120 ml. of beer containing 0.5 p.p.m. w./v. of diacetyl is added 100 mg. of the gelatin coated enzyme system. After approximately 72 hours at 5–7° C., the diacetyl concentration is 0.05 p.p.m. w./v.

EXAMPLE III

The process of Example II is repeated except for the addition of 1 gram of bakers' yeast (containing diacetyl reductase and reduced nicotinamide adenine dinucleotide), with comparable results.

EXAMPLE IV

The process of Example III is repeated wherein brewers' yeast (containing diacetyl reductase and reduced nicotinamide dinucleotide) is used in place of bakers' yeast, with comparable results.

EXAMPLE V

The processes of Example III and Example IV are repeated except for the use of 16 milligrams of reduced nicotinamide adenine dinucleotide in place of 160 milligrams, with comparable results.

EXAMPLE VI

The processes of Example III and Example IV are repeated without added reduced nicotinamide adenine dinucleotide, with comparable results.

EXAMPLE VII

Four grams of freeze-dried diacetyl reductase enzyme preparation and 1.6 grams of reduced nicotinamide adenine dinucleotide (P-L Bioichemicals, Milwaukee, Wis.) are mixed with 100 grams of a 10% w./w. aqueous solution of gelatin at 50–70° C., dispersed in a homogenizer for several minutes and chilled in a stainless steel tray in a refrigerator at about 5° C. until the gelatin has set. The coated enzyme mass is broken up, transferred while still cold to a suitable vessel and macerated with a high shear mixer in about a liter of hexane chilled to about 23–25° C., and dried to a final moisture content of about 7 to about 11%.

EXAMPLE VIII

The process of Example VII is repeated except for the addition of 10 grams of bakers' yeast (containing diacetyl reductase and reduced nicotinamide adenine dinucleotide), with comparable results.

EXAMPLE IX

The process of Example VIII is repeated wherein brewers' yeast (containing diacetyl reductase and reduced nicotinamide adenine dinucleotide) is used in place of bakers' yeast, with comparable results.

EXAMPLE X

The processes of Example VIII and Example IX are repeated except for the use of 160 milligrams of reduced nicotinamide adenine dinucleotide in place of 1.6 grams, with comparable results.

EXAMPLE XI

The processes of Example VIII and Example IX are repeated without added reduced nicotinamide adenine dinucleotide, with comparable results.

EXAMPLE XII

Four grams of freeze-dried diacetyl reductase enzyme preparation and 1.6 grams of reduced nicotinamide adenine dinucleotide (P-L Biochemicals, Milwaukee, Wis.) are dispersed in an aqueous 25% slurry into 200 ml. of light mineral oil (U.S.P.) at about 30–40° C. with a propeller-type mixer. With continuous vigorous stirring at 30–40° C., 100 grams of a 20% w./w. aqueous solution of high-bloom gelatin is added in a thin stream. The mixture is then chilled to about 10–20° C. Approximately 200 ml. of cold ethanol is added. After decantation, the beadlets are filtered and washed with cold hexane. The beadlets are tray dried or fluid-bed dried at 5–10° C. to solids containing about 7 to about 11% moisture.

To 100 ml. of beer containing 0.65 p.p.m. w./v. of diacetyl is added 140 mg. of encapsulated enzyme material. After 24 hours at 2° C., the diacetyl content is 0.38 p.p.m. w./v.

EXAMPLE XIII

The process of Example XII is repeated except for the addition of 10 grams of bakers' yeast (containing diacetyl reductase and reduced nicotinamide adenine dinucleotide), with comparable results.

EXAMPLE XIV

The process of Example XII is repeated except for the addition of brewers' yeast (containing diacetyl reductase and reduced nicotinamide adenine dinucleotide) with comparable results.

EXAMPLE XV

The process of Example XIII and Example XIV are repeated except for the use of 160 milligrams of reduced nicotinamide adenine dinucleotide in place of 1.6 grams, with comparable results.

EXAMPLE XVI

The processes of Example XIII and Example XIV are repeated without adding reduced nicotinamide adenine dinucleotide, with comparable results.

EXAMPLE XVII

Four hundred milligrams of freeze-dried reductase enzyme preparation and 160 milligrams of reduced nicounamide adeninne dinucleotide (P–L Biochemicals, Milwaukee, Wis.) are mixed with 50 ml. of a 2% w./w. aqueous solution of sodium alginate (Kelco Co., Clark, N. J.). The mixture is then added dropwise to a vessel, with agitation, containing 400 ml. of a 2.5% w./v. solution of calcium chloride. The beadlets are filtered and fluid-bed dried to about 85% solids.

EXAMPLE XVIII

One thousand ml. of a 10% slurry of brewers' yeast and one gram of freeze-dried diacetyl reductase are mixed at 5° C. with 50 ml. of a 2% w./w. aqueous solution of sodium alginate (Kelco Co., Clark, N. J.). The mixture is then added dropwise to a vessel, with agitation, containing 4 liters of a 2.5% w./v. solution of calcium chloride. The bedlets are filtered and fluid-bed dried or tray dried to about 85% solids.

To 100 ml. of beer having a diacetyl content of 0.63 p.p.m. w./v. of diacetyl is added 130 mg. of encapsulated beadlets. After 24 hours at 2° C., the diacetyl content is reduced to 0.40 p.p.m. w./v.; after 72 hours the level is reduced to 0.34 p.p.m. w./v.

EXAMPLE XIX

The process of Example XVIII is repeated with bakers' yeast in place of brewers' yeast, with comparable results.

What is claimed is:

1. The process of encapsulating with gelatin in beadlet form a material selected from the group consisting of (1) diacetyl reductase and reduced nicotinamide adenine dinucleotide, (2) diacetyl reductase and reduced nicotinamide adenine dinucleotide and viable bakers' or brewers' yeast containing within said yeast diacetyl reductase and reduced nicotinamide adenine dinucleotide, (3) diacetyl reductase and viable bakers' or brewers' yeast containing within said yeast diacetyl reductase and reduced nicotinamide adenine dinucleotide, which comprises adding an aqueous solution of high-bloom gelatin at 30–40° C. to a slurry of said material in light mineral oil, chilling the mixture to about 10–20° C., removing and washing the beadlets with cold hexane, and drying at 5–10° C. to a final moisture content of about 7 to about 11%.

2. The process of encapsulating in beadlet form a material selected from the group consisting of (1) diacetyl reductase and reduced nicotinamide adenine dinucleotide, (2) diacetyl reductase and reduced nicotinamide adenine dinucleotide and viable bakers' or brewers' yeast containing within said yeast diacetyl reductase and reduced nicotinamide adenine dinucleotide, (3) diacetyl reductase and viable bakers' or brewers' yeast containing within said yeast diacetyl reductase and reduced nicotinamide, adenine dinucleotide, which comprises adding a slurry of said material in an aqueous solution of sodium alginate at about 2–10° C. to an aqueous solution of calcium chloride, removing the calcium alginate coated beadlets and drying to a final moisture content of about 10 to about 20%.

3. A beer additive particularly useful for removing objectionable buttery odor and flavor from beer which consists essentially of the product obtained by carrying out the process of claim 1.

4. A beer additive particularly useful for removing objectionable buttery odor and flavor from beer which consists essentially of the product obtained by carrying out the process of claim 2.

5. A method for lowering diacetyl content of beer which comprises adding a small but effective amount of the product of claim 3 to beer prior to packaging.

6. A method for lowering diacetyl content of beer which comprises adding a small but effective amount of the product of claim 4 to beer prior to packaging.

References Cited

UNITED STATES PATENTS

| 2,642,376 | 6/1953 | Gale et al. | 195—63 |
| 3,130,055 | 4/1964 | Segel et al. | 99—48 |
| 3,328,257 | 6/1967 | Vrancken et al. | 424—37 |
| 413,886 | 10/1889 | Barnes | 195—54 |
| 3,396.117 | 8/1968 | Schuetze | 252—316 X |

OTHER REFERENCES

Chang, T. M. S.; "Semipermeable Microcapsules," Science, vol. 146, October 1964 (pp. 524–525) Q1534.

DAVID M. NAFF, Primary Examiner

U.S. Cl. X.R.

99—31; 195—63, 68; 252—316